United States Patent [19]

Lew

[11] Patent Number: 4,813,289

[45] Date of Patent: Mar. 21, 1989

[54] CONVECTIVE ATTENUATION FLOWMETER

[76] Inventor: Hyok S. Lew, 7890 Oak St., Arvada, Colo. 80005

[21] Appl. No.: 71,777

[22] Filed: Jul. 10, 1987

[51] Int. Cl.$^4$ .............................................. G01F 1/80
[52] U.S. Cl. .................................................. 73/861.38
[58] Field of Search .......................... 73/861.37, 861.38

[56] References Cited

U.S. PATENT DOCUMENTS

| | | | |
|---|---|---|---|
| 3,080,750 | 3/1963 | Wiley et al. ............................ | 73/861 |
| 3,218,851 | 11/1965 | Sipin ....................................... | 73/861 |
| 4,096,745 | 6/1978 | Rivkin et al. ......................... | 73/861.37 |
| 4,470,294 | 9/1984 | Hamel ................................... | 73/861.37 |
| 4,622,858 | 11/1986 | Mizerak ............................... | 73/861.38 |

*Primary Examiner*—Herbert Goldstein

[57] ABSTRACT

A mass flowmeter comprises an elongated conduit with one extremity connected to an inlet leg and restrained from moving laterally and the other extremity connected to an outlet leg by an axially resilient coupling disposed generally perpendicular to the elongated conduit, wherein the outlet leg is restrained from moving laterally. An electromagnetic vibrator generates flexural vibrations of the conduit intermittently or continuously and a motion detector measures attenuation or level of the kinetic energy of the flexural vibrations. The mass flow rate of media moving through the conduit is determined from a portion of the attenuation or damping of the flexural vibrations, which portion is caused by the convective transport of the kinetic energy of the flexural vibrations by the moving media through the conduit.

16 Claims, 2 Drawing Sheets

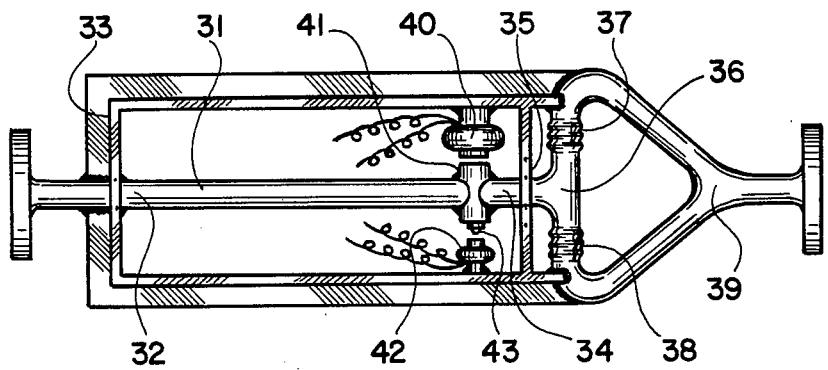
Fig. 5
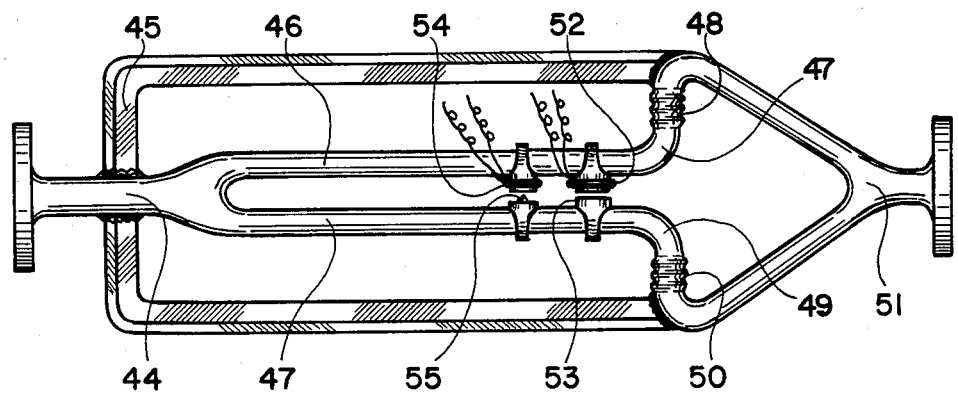
Fig. 6
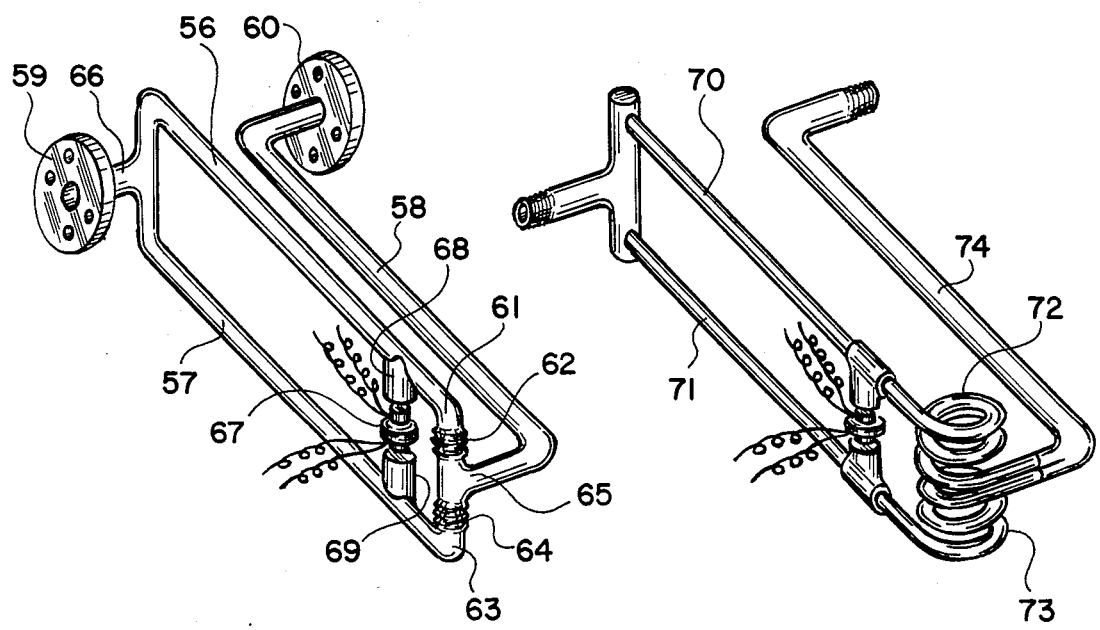
Fig. 7
Fig. 8

CONVECTIVE ATTENUATION FLOWMETER

BACKGROUND OF THE INVENTION

As automation in the chemical, mineral, pharmaceutical and food processing industries has become an absolute necessity in today's fiercely competitive industrial business, demand for reliable and accurate flowmeters in those industries is rapidly increasing. The most popular mass flowmeter available to the processing industries at the present time is the type known as the Coriolis force flowmeter. Though the Coriolis force flowmeter provides a unique way to measure the mass flow accurately and reliably, it has three major short comings, which are; (1) it is not capable of measuring flow of a medium having a low density such as steam and gases; (2) it is absolutely impractical to construct and operate a Coriolis force flowmeter of port size greater than two inches in diameter, and (3) it is too expensive. Therefore, there is need for a mass flowmeter that is more sensitive and less expensive compared with the Coriolis force flowmeter.

BRIEF SUMMARY OF THE INVENTION

The primary object of the present invention is to provide a mass flowmeter that determines flowrate by measuring the convective attenuation of the flexural vibration of the flowmeter conduit, which attenuation takes place because matter moving through the flowmeter conduit absorbs energy from the vibrating flowmeter conduit and carries it away therewith.

Another object is provide a convective attenuation mass flowmeter wherein the flexural vibration of the flowmeter conduit is generated by a series of impulses intermittently imposed on the conduit and the convective attenuation is measured by detecting the diminishing amplitude of the flexural vibration.

A further object is to provide a convective attenuation mass flowmeter wherein the rate of mass flow is determined from the ratio of the amplitude of the flexural vibration of the flowmeter conduit to the time rate of energy input that is continuously supplied to an electromagnet inducing the flexural vibration of the flowmeter conduit.

Yet another object is to provide a convective attenuation mass flowmeter comprising a single flowmeter conduit.

Yet a further object is to provide a convective attenuation mass flowmeter comprising two flowmeter conduits, which are vibrated in a mirror image mode.

Still another object is to provide a convective mass flowmeter of large port sizes as well as small port sizes.

Still a further object is to provide a convective mass flowmeter of a high sensitivity, that is capable of measuring flows of steam and gases as well as liquids.

These and other objects of the present invention will become clear as the describtion thereof proceeds.

BRIEF DESCRIPTION OF THE FIGURES

The present invention may be described with a great clarity and specificity by referring to the following figures:

FIG. 5 illustrates another embodiment of the convective attenuation flowmeter including a single vibrating conduit.

FIG. 6 illustrates an embodiment of the convective attenuation flowmeter including dual vibrating conduit.

FIG. 7 illustrates another embodiment of the convective attenuation flowmeter including dual vibrating conduit.

FIG. 8 illustrates a further embodiment of the convective attenuation flowmeter including dual vibrating conduit.

DESCRIPTION OF THE ILLUSTRATED EMBODIMENTS

Figure 1:
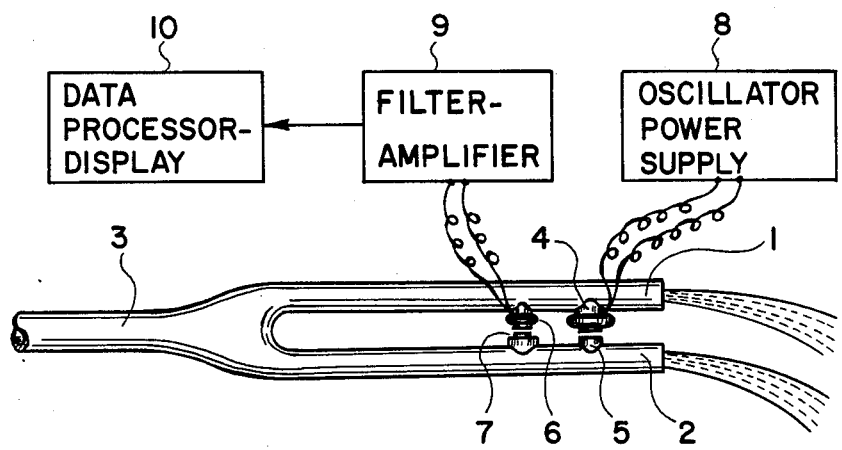
FIGS. 1 illustrates an embodiment of the convective attenuation flowmeter of the present invention constructed as a nozzle meter.

In FIG. 1 there is illustrated an embodiment of the convective attenuation flowmeter of the nozzle type, that is constructed in accordance with the principles of the present invention. This flowmeter comprises two generally parallel vibrating conduits 1 and 2 extending from a common flow intake conduit 3 in a cantilever arrangement, which combination is much similar to a tuning fork constructed of a hollow bar. The means for imposing flexural vibrations includes an electromagnet 4 and a ferromagnetic member 5 respectively affixed to the two vibrating conduits 1 and 2. The means for detecting the relative flexural motion between the two vibrating conduits 1 and 2 includes a position or velocity detector such as a magnetic detector that comprises a pick-up coil 6 and magnetic target 7 respectively affixed to the two vibrating conduits 1 and 2. It should be mentioned that the vibrator including the elements 4 and 5 and the vibration detector including the elements 6 and 7 may be packaged in a single assembly as illustrated in FIG. 7 or 8. The oscillator power supply 8 supplies dc or ac electric currents to the vibartor electromagnet 4 in pulses or in a continuous manner. The filter-amplifier 9 filters out the noise and amplifies the electric signal associated with the vibration of the vibrating conduits 1 and 2. The data processor 10 converts the electric signal from the filter-amplifier 9 to flow data, which may be displayed or transmitted to other flow processing or controlling devices.

The convective attenuation flowmeter of the present invention such as the embodiment shown in FIG. 1 operates on the following principles: The fluid entering the inlet section of the two vibrating conduits 1 and 2 has kinetic energy flux equal to $$E_{IN} = \tfrac{1}{2}\rho U^3 A, \qquad (1)$$

while the fluid leaving the free end of the vibrating conduits 1 and 2 has energy flux equal to $$E_{OUT} = (\tfrac{1}{2}\rho U^2 + \tfrac{1}{2}\rho v^2)UA, \qquad (2)$$

where $\rho$ is the fluid density, U is the flow velocity A is the total cross sectional area of the two vibrating conduits 1 and 2 and v is the root mean square value of the velocity of the flexural vibration of the vibrating conduits 1 and 2. It is clear from equations (1) and (2) that the fluid moving through the vibrating conduits 1 and 2 absorbs energy from the vibrating conduits 1 and 2 at a rate equal to $$\left.\frac{dE}{dt}\right)_{CONV.} = \tfrac{1}{2}\rho v^2 UA. \qquad (3)$$

There is internal energy dissipation within the wall of the vibrating conduits 1 and 2 and fluid medium flowing therethrough and the interface between the surfaces of the conduit and fluid medium due to viscous damping, which takes place at a rate proportional to square of the root mean square velocity v $$\left.\frac{dE}{dt}\right)_{DAMP.} = K_1 \mu v^2, \qquad (4)$$

where $K_1$ is a constant of proportionality and $\mu$ is the total dynamic viscosity representing all energy dissipations in the system associated with the flexural vibrations. The total kinetic energy of the vibrating conduits 1 and 2 is given by equation $$E_{VIB.} = K_2 \tfrac{1}{2} M v^2, \qquad (5)$$

where $K_2$ is a constant of proportionality and M is the mass of the conduit associated with the flexural vibrations. The time rate of decrease of the kinetic energy given by equation (5) is equal to the sum of the total energy taken away that is equal to the sum of equations (3) and (4), which condition yields a linear first order diferential equation with a solution gives by equation $$v = v_0 \exp.[-(C_1 + C_2 \rho UA)t]. \qquad (6)$$

where $C_1$ and $C_2$ are constants which can be easity determined by the calibrating procedure of the flowmeter. The output signal $V_{out}$ from the vibration detector is proportional to the left hand side of equation (6) and, consequently, given by equation $$V_{OUT} = V_0 \exp.[-(C_1 + C_2 \rho UA)t]. \qquad (7)$$

The mass flow rate is found by solving equation (7) for $\rho UA$, $$\rho UA = \frac{C_1}{\Delta t}\left[\ln\frac{V_{OUT1}}{V_{OUT2}} - \ln\left(\frac{V_{OUT1}}{V_{OUT2}}\right)_{U=0}\right], \qquad (8)$$

where subscripts 1 and 2 respectively designate the amplitudes of the output signals at two different instants separated by a time interval equal to $\Delta t$ and the subscript $U=0$ designates the value corresponding to a state where the fluid velocity is equal to zero. For fluid flows at reasonably high Reynolds numbers, the energy dessipation due to the viscous damping is much smaller than that caused by the convective attenuation and, consequently, equation (8) may be approximated by equation $$\rho UA \cong \frac{C_1}{\Delta t}\ln\frac{V_{OUT1}}{V_{OUT2}}. \qquad (9)$$

The equations (8) and (9) show that the mass flow rate $\rho UA$ can be determined by measuring the attenuation of the flexural vibrations of the vibrating conduits 1 and 2.

It should be mentioned that the mass or inertia of the two vibrating conduits 1 and 2 should be balanced so that the vibrating motions of the two vibrating conduits are mirror images to one another. For such a balanced combination, the vibrating motion imposed by the electromagnetic vibrator generates only the relative vibrating motions between the two vibrating conduits 1 and 2 and does not create any external vibration thereof. Of course, it should be understood that the convective attenuation flowmeter of the nozzle type meter may include a single vibrating conduit instead of dual vibrating conduits. The only advantage provided by the dual vibrating conduits is the elimination of the external reaction resulting from the vibrating motion of the vibrating conduits.

Figure 2:
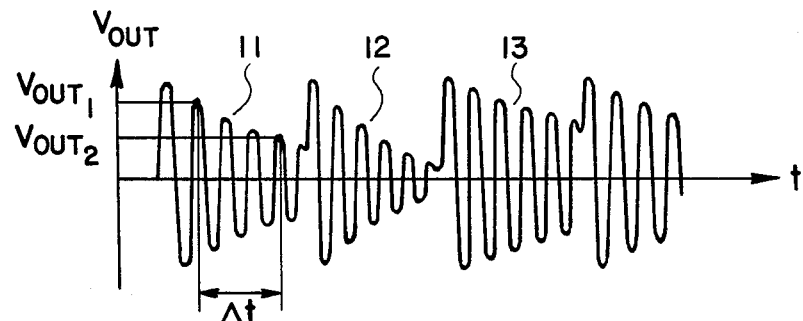
FIG. 2 illustrates a mode of operation of the convective attenuation flowmeter.

In FIG. 2 there is illustrated a mode of operation of the convective attenuation flowmeter of the present invention. The oscillator power supply 8 supplies electric currents in pulses to the vibrator electromagnet. These pulses of the electric current produce a series of natural vibrations of the vibrating conduits 11, 12 and 13, etc. which attenuate in accordance with equation (7). The mass flow rate is determined by finding the attenuation exponent from equation (8) or (9) or by curve fitting of the envelope of the attenuating vibrations to a standard decaying curve. The on-set of natural vibrations and attenuation analysis may be timed to repeat at time intervals ranging from a fraction of seconds to a few seconds depending on the time dependence of the fluid flow and the amount of the mass flow rate. For example, fluid flows rapidly fluctuating in time or flows of high mass flow rate producing a rapid attenuation requires a high frequency excitation of vibration and attenuation analysis, while a low frequency excitation and attenuation analysis is satisfactory for quasi steady fluid flows or flows of low mass flowrate. The power supply 8 and data processor 10 may be programmed in such a way that the frequency of the excitation and attenuation analysis is varied automatically as a function of the mass flow rate and/or the time dependence of the flow.

Figure 3:
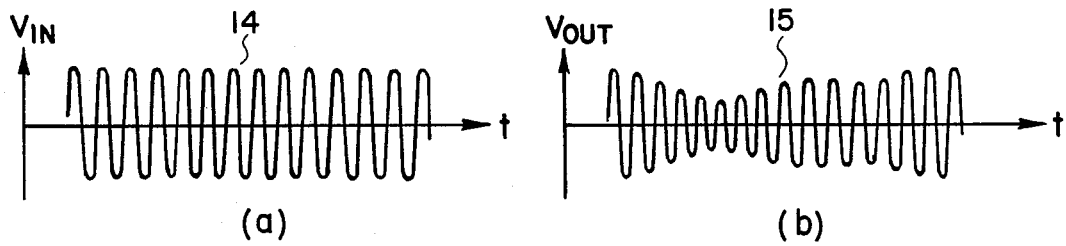
FIG. 3 illustrates another mode of operation of the convective attenuation flowmeter.

In FIG. 3 there is illustrated another mode of operation of the convective attenuation flowmeter of the present invention. In this mode of operation, the vibrator electromagnet is continuously energized by a series of pulsed dc currents or by alternating currents 14 of constant or known amplitude as shown in FIG. 3-a. The time rate of total energy loss is equal to the sum of the convective energy transfer given by equation (3) and the viscous dissipation given by equation (4), $$\left.\frac{dE}{dt}\right)_{OUT} = (\tfrac{1}{2}\rho UA + K_1\mu)v^2. \qquad (10)$$

Since the output electromotive force $V_{out}$ from the vibration detector is proportional to the velocity of the vibration, equation (10) can be written in the form $$\left.\frac{dE}{dt}\right)_{OUT} = K_3(\tfrac{1}{2}\rho UA + K_1\mu)V^2_{OUT}, \qquad (11)$$

where $K_3$ is a constant of proportionality. The time rate of energy input to the vibrating system is given by equation $$\left.\frac{dE}{dt}\right)_{IN} = K_4 V_{IN}^2, \qquad (12)$$

where $K_4$ is a constant of proportionality and $V_{in}$ is input electromotive force. The time rate of energy input has to be equal to the time rate of energy loss. By equating the right hand sides of equations (11) and (12), one obtains relationship $$\rho U A = C_2 \left(\frac{V_{IN}}{V_{OUT}}\right)^2 - 2K_1 \mu, \qquad (13)$$

where $C_2$ is a constant equal to $2K_4/K_3$. The constants $C_2$ and $K_1$ can be determined by the calibration procedure of the flowmeter. For fluid flows at large Reynolds numbers, equaiton (13) may be approximated by equation $$\rho U A = C_2 \left(\frac{V_{IN}}{V_{OUT}}\right)^2. \qquad (14)$$

According to equation (14), the output electromotive force $V_{out}$ decreases with increasing mass flow rate $\rho UA$ and increases with decreasing mass flow rate. The typical output electromotive force $V_{out}$ varying as a function of the mass flow rate under a constant input electromotive force is illustrated in FIG. 3-b.

Figure 4:
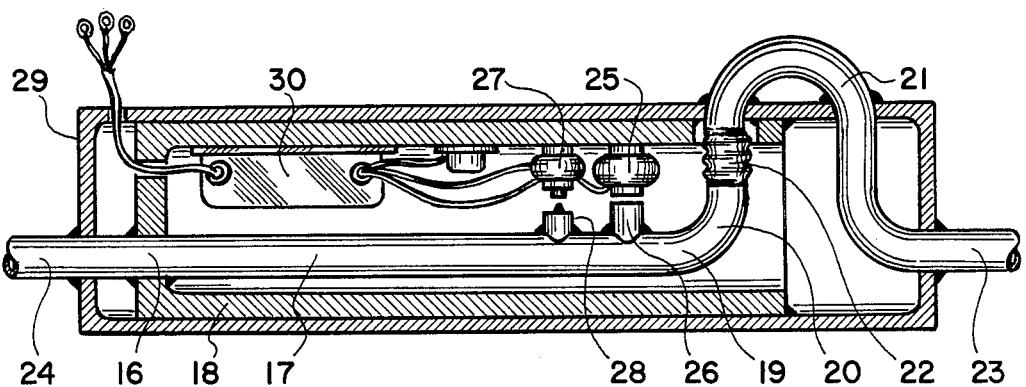
FIG. 4 illustrates an embodiment of the convective attenuation flowmeter including a single vibrating conduit.

In FIG. 4 there is illustrated an embodiment of the in-line convective attenuation flowmeter of the present invention including a single vibrating conduit. The inlet extremity 16 of the vibrating conduit 17 is immovably secured or affixed to a rigid frame 18, while the outlet extremity 19 including an elbow 20 is connected to the outlet conduit 21 by a bellow coupling 22 that allows the flexural movements of the vibrating conduit 17 on a plane including the central axis thereof and the central axis of the bellow coupling 22. The extremity of the outlet conduit 21 connected to the bellow coupling 22 is rigidly affixed to the rigid frame 18. The outlet 23 of the flowmeter is in-line with the inlet 24. The vibrator electromagnet 25 affixed to the rigid frame 18 attracts the ferromagnetic member 26 affixed to the vibrating conduit 17 when the electromagnet 25 is energized. The vibration detector includes a detector coil 27 affixed to the rigid frame 18 and the permanent magnet target 28 affixed to the vibrating conduit 17. The combination of the vibrating conduit 17, bellow coupling 22, the vibrator 25-26 and the detector 27-28 are enclosed within the evacuated interior space of the sealed enclosure 29, which also contains the electronic package including a power supply energizing the vibrator electromagnet and a filter-amplifier processing the output signal from the vibration detector. The convective attenuation flowmeter illustrated in FIG. 4 operates in either of the two modes respectively descrived in conjunction with FIGS. 2 and 3.

In FIG. 5 there is illustrated another embodiment of the convective attenuation flowmeter with a single vibrating tube, that has a construction symmetric about a plane including the central axis of the vibrating conduit 31 and perpendicular to the plane of flexural vibration. The inlet extremity 32 of the vibrating conduit 31 is immovably affixed to the rigid frame 33, while other extremity 34 extending through an oversized hole 35 disposed through the rigid frame 33 includes a tee coupling 36 with two outlet extremities having a pair of bellow couplings 37 and 38 respectively, which bellow couplings are connected to a Y-shaped outlet conduit 39. The vibrator electromagnet 40 affixed to the rigid frame 33 vibrates the combination of the ferromagnetic member 41 and the vibrating conduit 31. The detector coil 42 affixed to the rigid frame 33 detects the motion of the magnetic target 34 affixed to the vibrating conduit 31. It should be mentioned that it is important to secure the two extremities of the Y-shaped outlet conduit 39 connected to the two bellow couplings 37 and 38 rigidly to the rigid frame, whereby the flexural vibration of the vibrating conduit is generated exclusively by the vibrator electromagnet 40. The vibrating conduit 31 and the accessories thereof may be enclosed within an evacuated container as shown in FIG. 4, in order to eliminate the attenuation of vibration due to the ambient air.

In FIG. 6 there is illustrated an embodiment of the convective attenuation flowmeter comprising dual vibrating conduits. The inlet conduit 44 immovably secured to the rigid frame 45 bifurcates into a pair of vibrating conduits 46 and 47. The downstream extremities of the two vibrating conduits 46 and 47 respectively include the combinations of the ell and bellow couplings 47-48 and 49-50, wherein the bellow opening couplings 48 and 50 are connected to a Y-shaped outlet conduit 51. It should be noticed that the extremities of the Y-shaped outlet conduit 51 connected to the bellow couplings 48 and 50 are rigidly affixed to the rigid frame. The vibrator including an electromagnet 52 affixed to the first vibrating conduit 46 and a ferromagnetic element 53 affixed to the second vibrating conduit 47 imposes flexural vibrating motions wherein the two vibrating conduits 46 and 47 vibrate in mirror images to one another about a plane of structural symmetry. The vibration detector including a detector coil 54 affixed to the first vibrating conduit 46 and a magnetic target 55 affixed to the second vibrating conduit 47 detects the relative flexural vibration of the two vibrating conduits. It is important to balance the mass and inertia of the two vibrating conduits. In order to eliminate the attenuation created by the ambient air surrounding the two vibrating conduits, the entire assembly excluding the inlet and outlet flanges may be enclosed within an evacuated container. The convective attenuation flowmeter comprising dual vibrating conduits operates in either of the two modes described in conjunction with FIGS. 2 and 3 or in combination of the two modes.

In FIG. 7 there is illustrated another embodiment of the convective attenuation flowmeter comprising dual vibrating conduits, which has essentially the same construction as the embodiment shown in FIG. 6 with a few exceptions. The pair of the vibrating conduits 56 and 57, and the outlet conduit 58 are diaposed in an arrangement extending from the line of the fluid flow, which arrangement reduces the distance between the inlet and outlet flanges 59 and 60 of the flowmeter. The downstream extremities of the two vibrating conduits respectively including the combinations of the ell and bellow couplings 61-62 and 63-64 are connected to a tee coupling 65 connected to the outlet conduit 58. In this illustrated embodiment, the rigid frame immovably securing the inlet and outlet conduits 66 and 58, and the tee coupling 65 is not shown for the brevity of the illustration. The vibration and detection thereof is excuted by the combination of an electromagnet-detector coil 67 rigidly affixed to the rigid frame (not shown) and a pair of ferromagnetic element-magnetic targets 68 and 69 respectively affixed to the two vibrating conduits 56 and 57. The assembly may be enclosed within an evacuated container. It should be mentioned that the in-line embodiment shown in FIG. 6 may be modified into an over-hanging embodiment as shwon in FIG. 7, while the overhanging embodiment shown in FIG. 7 may be converted into an in-line embodiment as shown in FIG. 6.

In FIG. 8 there is illustrated a further embodiment of the convective attenuation flowmeter comprising dual vibrating conduits which has essentially the same construction as the embodiment shown in FIG. 7 with one exception being that the downstream extremities of the two vibrating tubings 70 and 71 are formed into two coils 72 and 73, which are connected to the outlet conduit 74.

It is well known that square of the natural frequency f of a vibrating conduit is proportional to the elastic modulus of the vibrating conduit and inversely proportional to the total mass involved in the vibration, which relationship yields the following equation for the density $\rho$ of the medium occupying the vibrating conduit:

$$\rho = \frac{A}{f^2} - B, \tag{15}$$

where A and B are constants intrinsic to the physical and mechanical characteristics of the vibrating conduit, which are independent of the physical properties of the medium occupying the vibrating conduit. Once the constants A and B are determined by calibrating procedure of the vibrating conduit density meter, the fluid density is determined from the natural frequency. Therefore, the convective attenuation flowmeter can be readily converted to a three-in-one meter that measures mass flow rates, fluid density and volumetric flow rate wherein the last variable is obtained from the ratio of the first two variables, when the data processor includes means for detecting the natural frequencies and the algorithms given by equation (15).

The most important element of the convective attenuation flowmeter is the vibrating conduit, which must have its downstream extremity connected to the outlet conduit in a laterally deflectable arrangement. The upstream extremity of the vibrating conduit may be supported in an immovable or laterally deflectable arrangement as the type of the securement of the upstream extremity of the vibrating conduit does not play a significant role in the operating characteristics as long as it provides a suitable structural restraint that is compatible with the flexural vibrations of the vibrating conduits.

While the principles of the present invention have now been made clear by the illustrated embodiments, there will be immediately obvious to those skilled in the art many modifications in the structures, arrangements, proportions, elements and materials which are particularly adapted to the specific working environments and operating conditions in the practice of the invention without departing from those principles.

I claim:

1. An apparatus for measuring rate of fluid flow comprising in combination:
    (a) at least one elongated conduit with one extremity connected to a first port leg and restrained from moving laterally, and the other extremity connected to a second port leg by at least one axially resilient coupling disposed in an angled arrangement with respect to the elongated conduit, wherein the second port leg is restrained from moving laterally;
    (b) means for intermittently inducing flexural vibrations of said elongated conduit on a plane generally parallel to the central axis of said axially resilient coupling;
    (c) means for measuring attenuation of the flexural vibrations of said elongated conduit; and
    (d) means for determining mass flow rate of media moving through said elongated conduit from a portion of the measured attenuation of the flexural vibrations, which portion is created by the media moving through said elongated conduit.

2. The combination as set forth in claim 1 wherein said combination includes means for determining the density of the media moving through the elongated conduit from the natural frequency of the flexural vibrations of said elongated conduit containing the media.

3. The combination as set forth in claim 2 wherein said combination includes means for determining volume flow rate of the media as the ratio of the mass flow rate to the density of the media.

4. The combination as set forth in claim 1 wherein said at least one axially resilient coupling comprises a bellow coupling connecting an angled extremity of said elongated conduit to said second port leg.

5. The combination as set forth in claim 1 wherein said at least one axially resilient coupling comprises a pair of bellow couplings respectively connecting bifurcated extremities of said elongated conduit to said second port leg.

6. An apparatus for measuring rate of fluid flow comprising in combination:
    (a) at least one elongated conduit with one extremity connected to a first port leg and restrained from moving laterally, and the other extremity connected to a second port leg by at least one axially resilient coupling disposed in an angled arrangement with respect to the elongated conduit, wherein the second port leg is restrained from moving laterally;
    (b) means for continuously exciting flexural vibrations of said elongated conduit on a plane generally parallel to the central axis of said axially resilient coupling with an energy input rate of known amount;
    (c) means for measuring kinetic energy level of the flexural vibrations of said elongated conduit; and
    (d) means for determining mass flow rate of media moving through said elongated conduit from a portion of kinetic energy dissipation, which portion is created by the media moving through said elongated conduit and determined from the measured kinetic energy level of the flexural vibrations of said elongated conduit.

7. The combination as set forth in claim 6 wherein said combination includes means for determining the density of the media moving through the elongated conduit from the natural frequency of the flexural vibrations of said elongated conduit containing the media.

8. The combination as set forth in claim 7 wherein said combination includes means for determining volume flow rate of the media as the ratio of the mass flow rate to the density of the media.

9. The combination as set forth in claim 6 wherein said at least one axially resilient coupling comprises a bellow couplng connecting an angled extremity of said elongated conduit to said second port leg.

10. The combination as set forth in claim 6 wherein said at least one axially resilient coupling comprises a pair of bellow couplings respectively connecting bifurcated extremities of said elongated conduit to said second port leg.

11. An apparatus for measuring rate of fluid flow comprising in combination:
   (a) at least one elongated conduit with one extremity connected to a first port leg and restrained from moving laterally, and the other extremity connected to a second port leg by a looped section of conduit, wherein said second port leg is restrained from moving laterally;
   (b) means for intermittently inducing flexural vibrations of said elongated conduit;
   (c) means for measuring attenuation of the flexural vibrations of said elongated conduit; and
   (d) means for determining mass flow rate of media moving through said elongated conduit from a portion of the measured attenuation of the flexural vibrations, which portion is created by the media moving through said elongated conduit.

12. The combination as set forth in claim 11 wherein said combination includes means for determining the density of the media moving through the elongated conduit from the natural frequency of the flexural vibrations of said elongated conduit containing the media.

13. The combination as set forth in claim 12 wherein said combination includes means for determining volume flow rate of the media as the ratio of the mass flow rate to the density of the media.

14. An apparatus for measuring rate of fluid flow comprising in combination:
   (a) at least one elongated conduit with one extremity connected to a first port leg and restrained from moving laterally, and the other extremity connected to a second port leg by a looped section of conduit, wherein said second port leg is restrained from moving laterally;
   (b) means for continuously exciting flexural vibrations of said elongated conduit with an energy input rate of known amount;
   (c) means for measuring kinetic energy level of the flexural vibrations of said elongated conduit; and
   (d) means for determining mass flow rate of media moving through said elongated conduit from a portion of kinetic energy dissipation, which portion is created by the media moving through said elongated conduit and determined from the measured kinetic energy level of the flexural vibrations of said elongated conduit.

15. The combination as set forth in claim 14 wherein said combination includes means for determining the density of the media moving through the elongated conduit from the natural frequency of the flexural vibrations of said elongated conduit containing the media.

16. The combination as set forth in claim 15 wherein said combination includes means for determining volume flow rate of the media as the ratio of the mass flow rate to the density of the media.

* * * * *